United States Patent
Barroso De Mello et al.

(10) Patent No.: US 12,129,719 B2
(45) Date of Patent: Oct. 29, 2024

(54) ADAPTER TOOL FOR COUPLING A BEND STIFFENER WITH DIVERLESS BELL MOUTH INTERFACE (DLBM) INTO A BSN900E BELL MOUTH AND ASSEMBLY METHOD

(71) Applicant: PETRÓLEO BRASILEIRO S.A.—PETROBRAS, Rio de Janeiro (BR)

(72) Inventors: Flavio Barroso De Mello, Rio de Janeiro (BR); Vinicius Gasparetto, Rio de Janeiro (BR); Bruno Pinho Dos Reis, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 18/256,606

(22) PCT Filed: Nov. 23, 2021

(86) PCT No.: PCT/BR2021/050513
§ 371 (c)(1),
(2) Date: Jun. 8, 2023

(87) PCT Pub. No.: WO2022/120446
PCT Pub. Date: Jun. 16, 2022

(65) Prior Publication Data
US 2024/0035344 A1   Feb. 1, 2024

(30) Foreign Application Priority Data
Dec. 11, 2020   (BR) .................. 10 2020 025456 1

(51) Int. Cl.
*E21B 17/01*   (2006.01)
*E21B 19/00*   (2006.01)

(52) U.S. Cl.
CPC .................. *E21B 19/004* (2013.01)

(58) Field of Classification Search
CPC ..................... E21B 17/017; E21B 19/004
See application file for complete search history.

(56) References Cited

U.S. PATENT DOCUMENTS

| 4,403,658 A | 9/1983 | Watkins |
| 4,808,034 A | 2/1989 | Birch |

(Continued)

FOREIGN PATENT DOCUMENTS

| BR | 102013019602 A2 | 10/2015 |
| EP | 3 473 801 | 4/2019 |

(Continued)

OTHER PUBLICATIONS

Gomes, Sep. 2018, Análise Numérica de Enrijecedor à Flexão para I-tube (Numerical Analysis of Flexure Stiffeners for I-tube), Master's Thesis, Univeridade Federal do Rio de Janeiro, 96 pp.

(Continued)

*Primary Examiner* — Matthew R Buck
(74) *Attorney, Agent, or Firm* — Knobbe Martens Olson & Bear, LLP

(57) ABSTRACT

In order to achieve the above-described objectives, the present invention provides an adapter tool for coupling a bend stiffener with diverless bell mouth (DLBM) interface in a bell mouth with BSN900E-type interface. The adapter tool is capable of maintaining interchangeability and flexibility between designs or design phases, even if different bell mouth models are used. A tool characterized in that it comprises an adapter split ring (10) that, in the upper part, has a geometry compatible with the dovetail profile of the BSN900E model helmet and, in the lower part, has a geometry compatible with the seating profile of the DLBM helmet (40). The present invention leads to two assembly (Continued)

methods, which guarantee the operational safety of the adapter assembly, namely: a method where it is only done by screws located in the split ring; and another, where the assembly includes, in addition to the split ring, an assembly with the support ring and rods.

9 Claims, 8 Drawing Sheets

(56) References Cited

U.S. PATENT DOCUMENTS

| | | | | |
|---|---|---|---|---|
| 5,318,385 | A * | 6/1994 | Goulart | ............... F16L 3/003 |
| | | | | 166/341 |
| 5,947,642 | A | 9/1999 | Teixeira | |
| 6,799,124 | B2 | 9/2004 | Perdue et al. | |
| 7,069,958 | B2 | 7/2006 | Filho | |
| 7,387,469 | B2 * | 6/2008 | Duggan | ............. E21B 17/017 |
| | | | | 405/211 |
| 7,467,914 | B2 * | 12/2008 | Finn | ............... E21B 17/015 |
| | | | | 405/224.2 |
| 8,939,214 | B2 | 1/2015 | Litherland | |
| 9,163,463 | B2 | 10/2015 | Smith | |
| 9,482,061 | B2 * | 11/2016 | Latimer | ............. E21B 17/085 |
| 9,587,446 | B2 * | 3/2017 | Teichmiller | ........ E21B 19/002 |
| 9,988,860 | B2 * | 6/2018 | Salem | ............... E21B 17/085 |
| 2005/0123358 | A1 | 6/2005 | Blakseth et al. | |
| 2024/0003197 | A1 | 1/2024 | Violante et al. | |

FOREIGN PATENT DOCUMENTS

| | | |
|---|---|---|
| GB | 2291686 | 1/1996 |
| WO | WO 2019/232605 | 12/2019 |
| WO | WO 2020/058710 | 3/2020 |

OTHER PUBLICATIONS

Schimidt, Felippe, 2016, Instalação de linhas flexíveis e umbilicais: testes de condicionamento e falhas operacionais (Installation of flexible lines and umbilicals: conditioning tests and operational failures), Master Thesis, Universidade Federal Fluminense.
International search report and written opinion dated Jun. 16, 2022 in application No. PCT/BR2021/050513.

* cited by examiner

FIG. 3
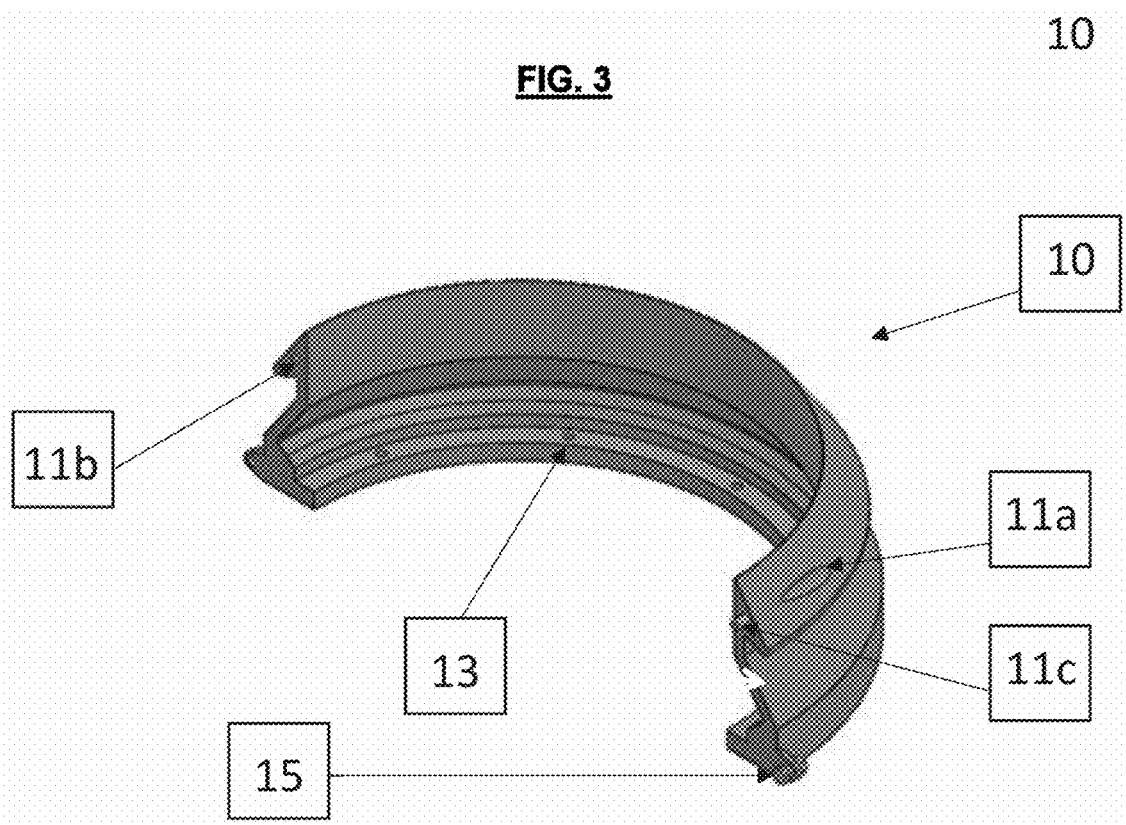
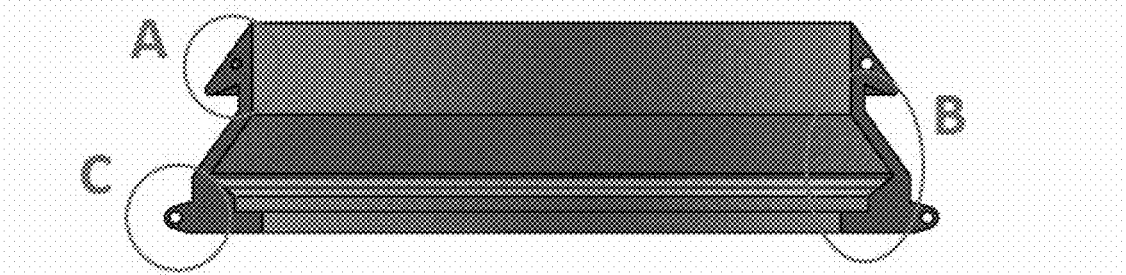

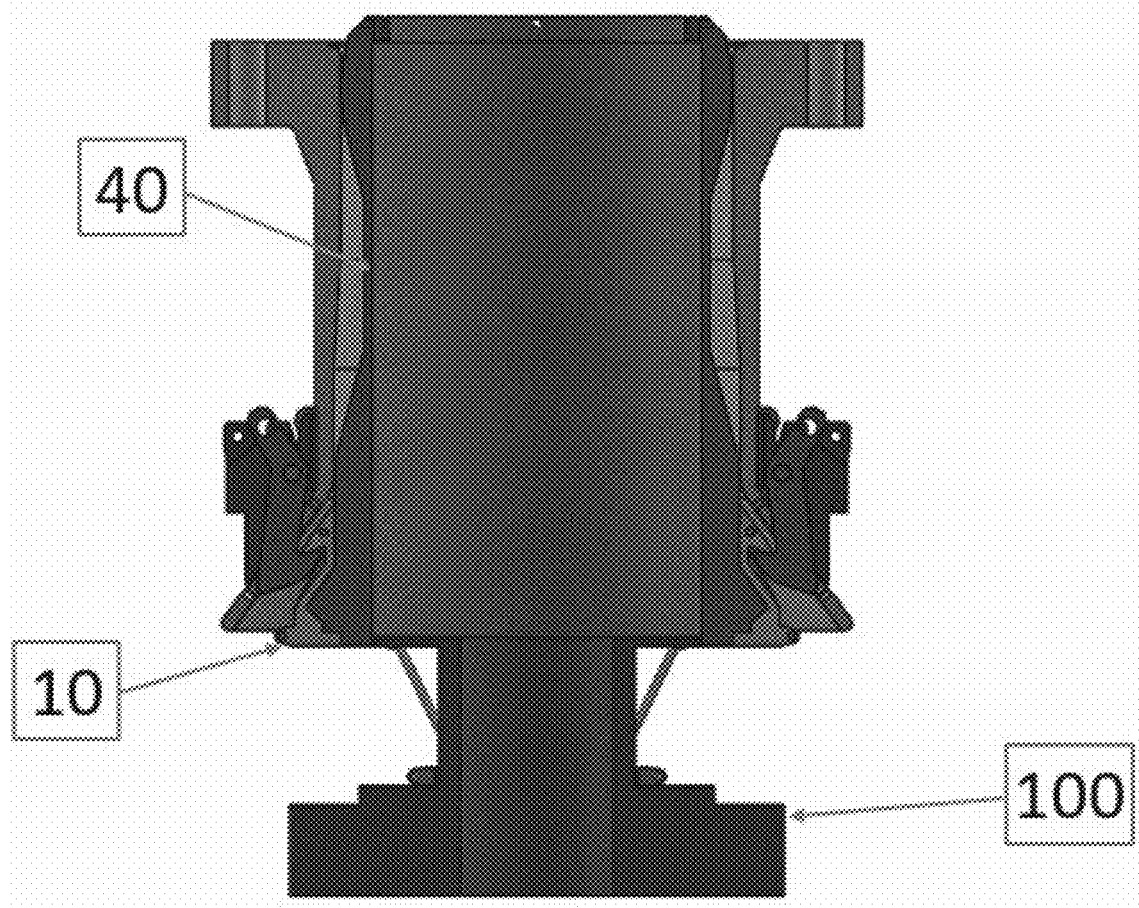

ADAPTER TOOL FOR COUPLING A BEND STIFFENER WITH DIVERLESS BELL MOUTH INTERFACE (DLBM) INTO A BSN900E BELL MOUTH AND ASSEMBLY METHOD

FIELD OF THE INVENTION

The present invention is based on the development of a solution for adapting between types of bell mouths.

The present invention pertains to the field of activities of risers of flexible pipelines and umbilicals with a diverless model bell mouth interface (DLBM) in SPUs that have BSN900E model bell mouths.

DESCRIPTION OF THE STATE OF THE ART

The reuse or sharing of flexible lines between designs is a frequent practice in oil industry designs. In order to facilitate the interchangeability of risers between production units, there was a need to recently establish a standardization for their supports. This standardization considers the use of BSN900E type bell mouths, since this is the most used model in the company's production units. However, the interface of this bell mouth model is not compatible with new developments aimed at reducing dive time. This difference in interfaces prevents the interchangeability of the lines between the two types of support.

To allow this, it would be necessary to refinish the top end of the risers to change the stiffener helmet, which would require the acquisition of new accessories and their respective assemblies on the line, with an impact on the readiness of the designs.

Usually, flexible risers are interconnected to platforms by devices that decouple the pipeline tension from side movements caused by displacements of the floating unit, the first portion being supported in a region close to the platform deck (Hang-off) and the side loads transferred to a connection device located in a position close to the bottom of the platform hull, with a sliding coupling between such a device and the pipeline. A typical example of such a widely used connection device is the bell mouth (U.S. Pat. No. 5,947, 642A), FIG. 1. Such decoupling between the tension and the side movements of the flexible risers provides great operational benefits for this pipeline technology, such as, for example, the increase of its useful life, not limited to this one. At Petrobras, the device described by document U.S. Pat. No. 5,947,642A is widely used, where the most common models are the BSN300, MFBM and BSN900E bell mouths, the latter being defined as the standard interface for interconnecting flexible risers to the SPU by Petrobras. The Multifunctional Bell Mouth (MFBM) is an interface structure capable of supporting bend stiffeners for flexible risers or supporting flexible joints (flexjoint) with rigid risers. It has good versatility and has the possibility of replacing the interfaces and standardizing its fastening.

Document EP3473801A1 discloses an apparatus for assembling a flexible line in a surface installation, a split ring with rods and coupled to the stiffener. Despite an adapter device that connects to the bend stiffener to assist in the connection with the riser, the document does not mention the possibility of using other types of support systems.

Document WO2019232605A1 discloses a coupling system between a bend stiffener and a bell mouth comprising a plurality of locking mechanisms wherein each locking mechanism is externally fastened to the bell mouth. Despite presenting a method for coupling a riser bend stiffener to a bell mouth, it is not capable of allowing interchangeability between two types of support.

Document U.S. Pat. No. 7,069,958B2 discloses an assembly and method of stiffening a flexible member whereby a rigid member and an adapter surround the flexible member and an insert extends in a ring between the adapter and the flexible member. Despite coupling between bend stiffeners and the bell mouth, the document is not able to allow interchangeability between two types of support.

In view of the difficulties present in the above-mentioned state of the art, and for adaptation solutions between different couplings, there arises the need of developing a technology capable of performing effectively and that is in accordance with the standardization recommendations. The above-mentioned state of the art does not have the unique features that will be presented in detail below.

Objective of the Invention

It is an objective of the invention to adapt the coupling of a bend stiffener with a diverless model bell mouth interface (DLBM) in a BSN900E type bell mouth interface.

Additionally, another objective of the present invention is to allow the interchangeability between the two support systems.

BRIEF DESCRIPTION OF THE INVENTION

In order to achieve the objectives described above, the present invention provides an adapter tool for coupling a bend stiffener with an interface for diverless bell mouth (DLBM) in a bell mouth of BSN900E model or MFBM model. The adapter tool is capable of maintaining interchangeability and flexibility between designs or design phases, even if different bell mouth models are used.

A tool characterized in that it comprises an adapter split ring that, in the upper part, has a geometry compatible with the dovetail profile of the BSN900E model helmet and, in the lower part, has a geometry compatible with the seating profile of the DLBM helmet.

The present invention requires an oriented assembly, and for that there are two assembly methods, which can be performed either by direct fastening with screws or through support fastening using ring (10) and rods (22).

BRIEF DESCRIPTION OF THE DRAWINGS

The present invention will be described in more detail below, with reference to the attached figures which, in a schematic way and not limiting the inventive scope, represent examples of its embodiment. In the drawings, there are:

FIG. 3 illustrating the adapter split ring;

FIG. 8 illustrating the application of the adapter split ring in the DLBM type support system with the ring/rod fastening system.

DETAILED DESCRIPTION OF THE INVENTION

The development of the adapter tool disclosed here has been due to the search for greater interchangeability and flexibility between designs or design phases, even if different bell mouth models are used.

There follows below a detailed description of a preferred embodiment of the present invention, by way of example and in no way limiting. Nevertheless, it will be clear to a technician skilled on the subject, from reading this description, possible additional embodiments of the present invention still comprised by the essential and optional features below.

As previously described, the use of the DLBM is already planned for new exploratory designs due to its advantages over the BSN900E and MFBM models, such as the optimization of the riser connection process during the pull-in operation and the drastic reduction of Man Hours in Safety (HSE) in shallow diving activities.

Figure 1:
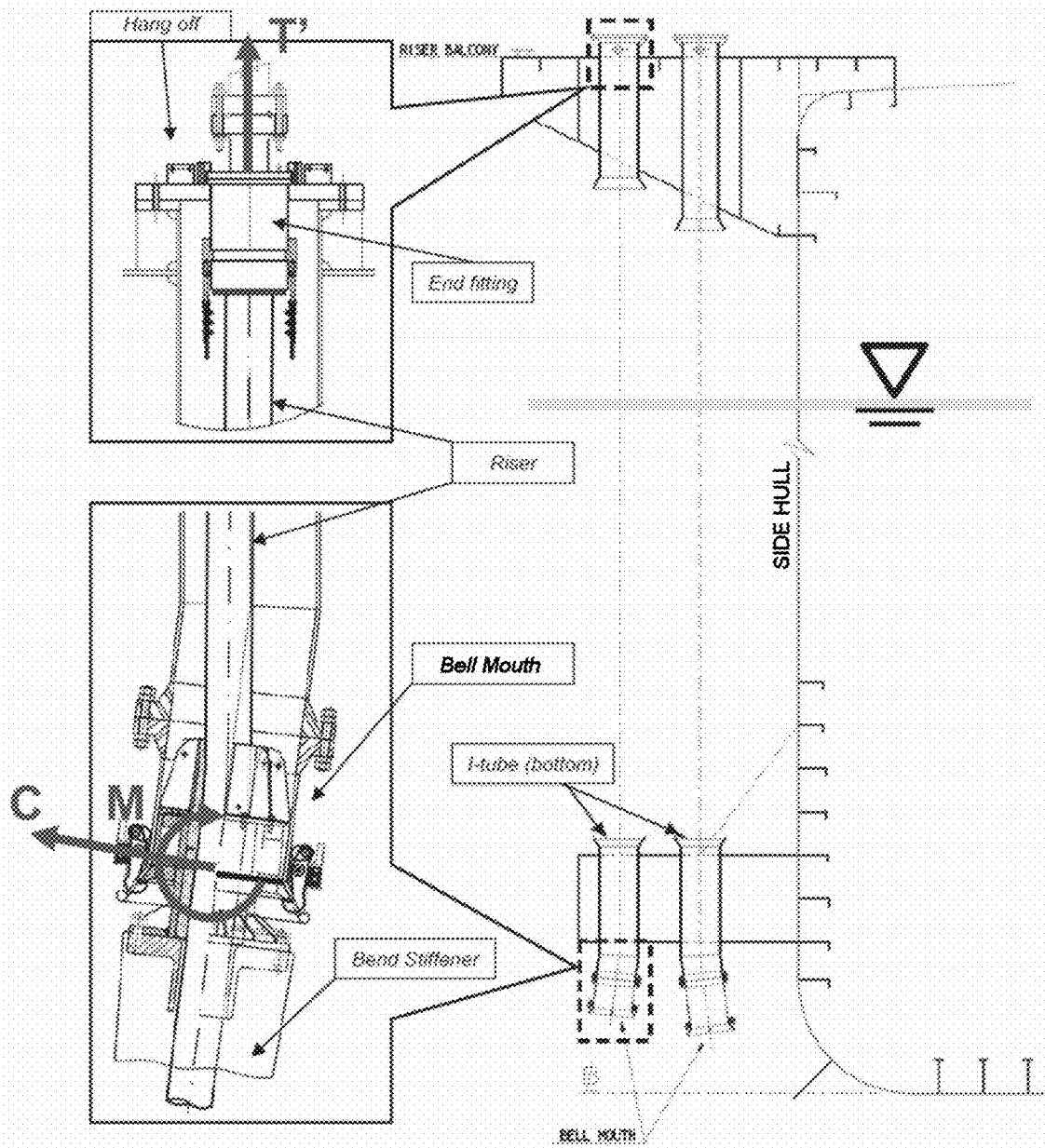
FIG. 1 representing the interconnection assembly between flexible risers with ships or platforms and illustrating the efforts applied.
Figure 2:
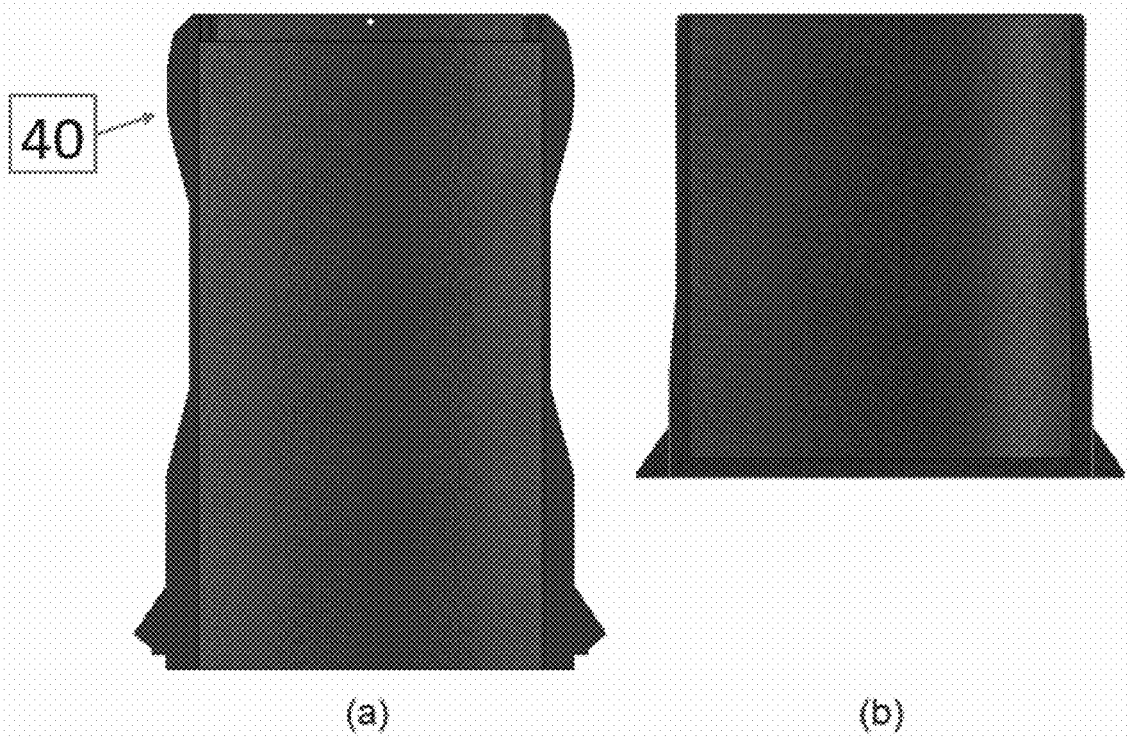
FIG. 2 illustrating the interfaces for coupling the bend stiffener, (a) DLBM and (b) BSN900E.

Despite some similarities between the two types of supports, the connection interfaces of the bend stiffeners present geometric dissimilarities (FIG. 2), making it impossible to couple a bend stiffener with an interface for the DLBM model bell mouth in a bell mouth of BSN900E or MFBM model. FIG. 2(a) shows a DLBM type bell mouth support and FIG. 2 (b) a BSN900E type support.

The adapter split ring (10) has, at the upper part, a geometry compatible with the dovetail profile of the BSN900E model helmet for locking the helmet (40) of the DLBM in the BSN900E bell mouth (detail A of FIG. 3). In addition, it preferably has two holes, a through hole (11a) (FIG. 3) and a threaded hole (11b) (FIG. 3), wherein the holes may not be limited to this configuration and quantity, and are for joining the two parts of the ring (10) by screws. At the lower part, the adapter split ring (10) has a geometry compatible with the seating profile of the helmet (40) of the DLBM on the tongue (130) (detail B of FIG. 3 and detail of FIG. 4), for fitting the helmet (40) of the same model. In this same location, there are preferably two eyes (15) for fasteners, where the number of eyes (15) may not be limited to that quantity, and which help to join the split ring (10) (detail C of FIG. 3). The split ring (10) also preferably has five through holes (13), where the holes are not limited to that quantity, and are for use with screws in the direct screw fastening system, shown in FIGS. 3 and 4.

There are two forms of interconnection between the helmet (40) (FIG. 2a) and the adapter split ring (10) (FIG. 3):

1—Direct screw fastening; or
2—Ring/rods support fastening.

Both interconnections can be made on board a vessel launching flexible lines, in the case of reuse of lines from other designs, or at the factory, in the case of sharing new flexible lines.

Figure 4:
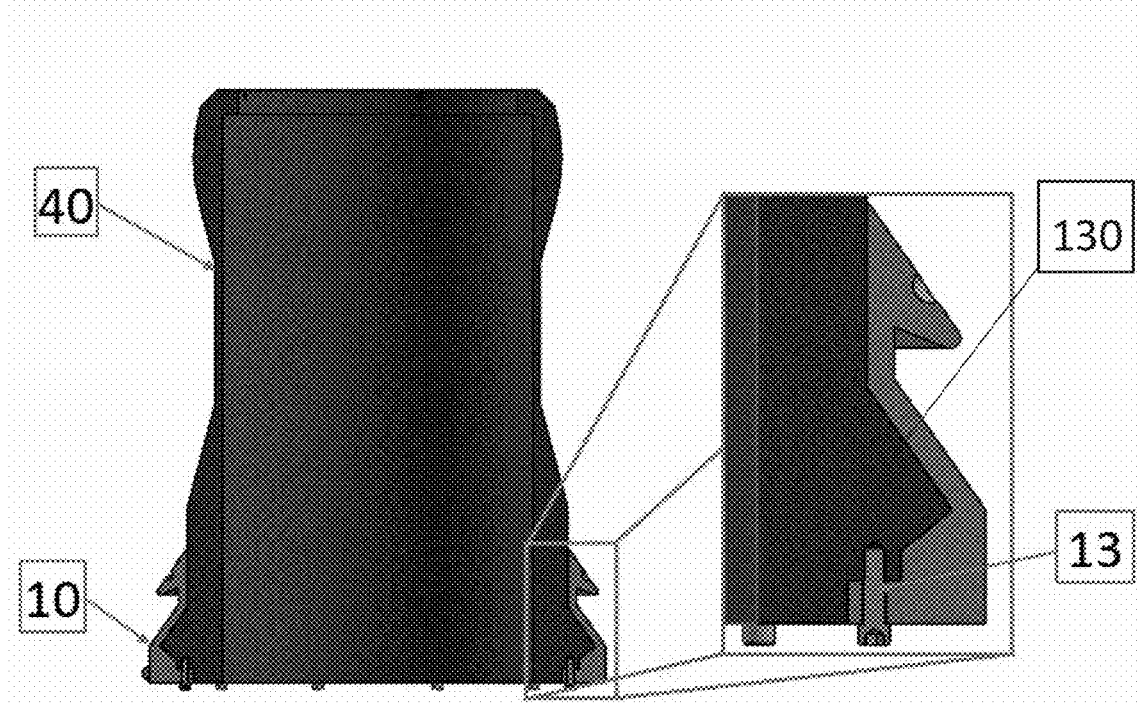
FIG. 4 illustrating the application of the adapter split ring in the DLBM type support system with a direct screw fastening system.

In the assembly where direct fastening occurs by screws, the adapter split ring (10), as shown in FIG. 4, can be fastened to the helmet (40) through the five through holes (13), wherein, in the proposed configuration, the joint of split rings total at least 10 holes. The total quantity of holes required to perform this fastening will depend on each design, as it will depend mainly on the applied diameter. In the case of sharing new lines between designs, this fastening can be done at the factory. In the case of reuse of previously manufactured lines, this fastening system depends on the machining capacity of the holes on board a vessel installing flexible pipelines. If this is not possible, the ring/rods support method should be used.

Figure 5:
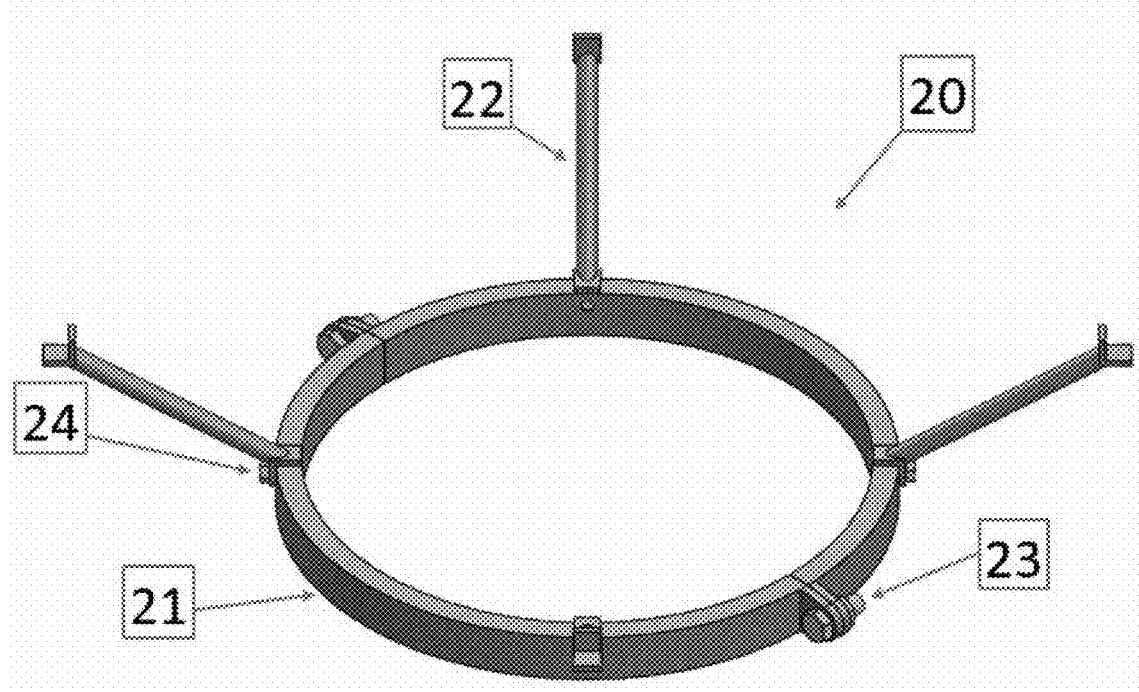
FIG. 5 illustrating the ring/rod support system.

In the fastening by support of the ring/rod assembly, in turn, the adapter split ring (10) (FIG. 3) can be fastened to the helmet (40) by installing a support system for the ring/rods assembly (20), as can be seen from FIG. 5. This system consists of a split support ring (21) and preferably four support rods (22), but not limited to that quantity, which are fastened to the support ring (21) with screws (24) (FIG. 5).

First, the rods (22) are mounted on one of the halves of the support ring (21) (FIG. 5). Then, the adapter split ring (10) is positioned below the helmet (40), together with the support ring (21) and the rods (22) (FIG. 6).

Figure 7:
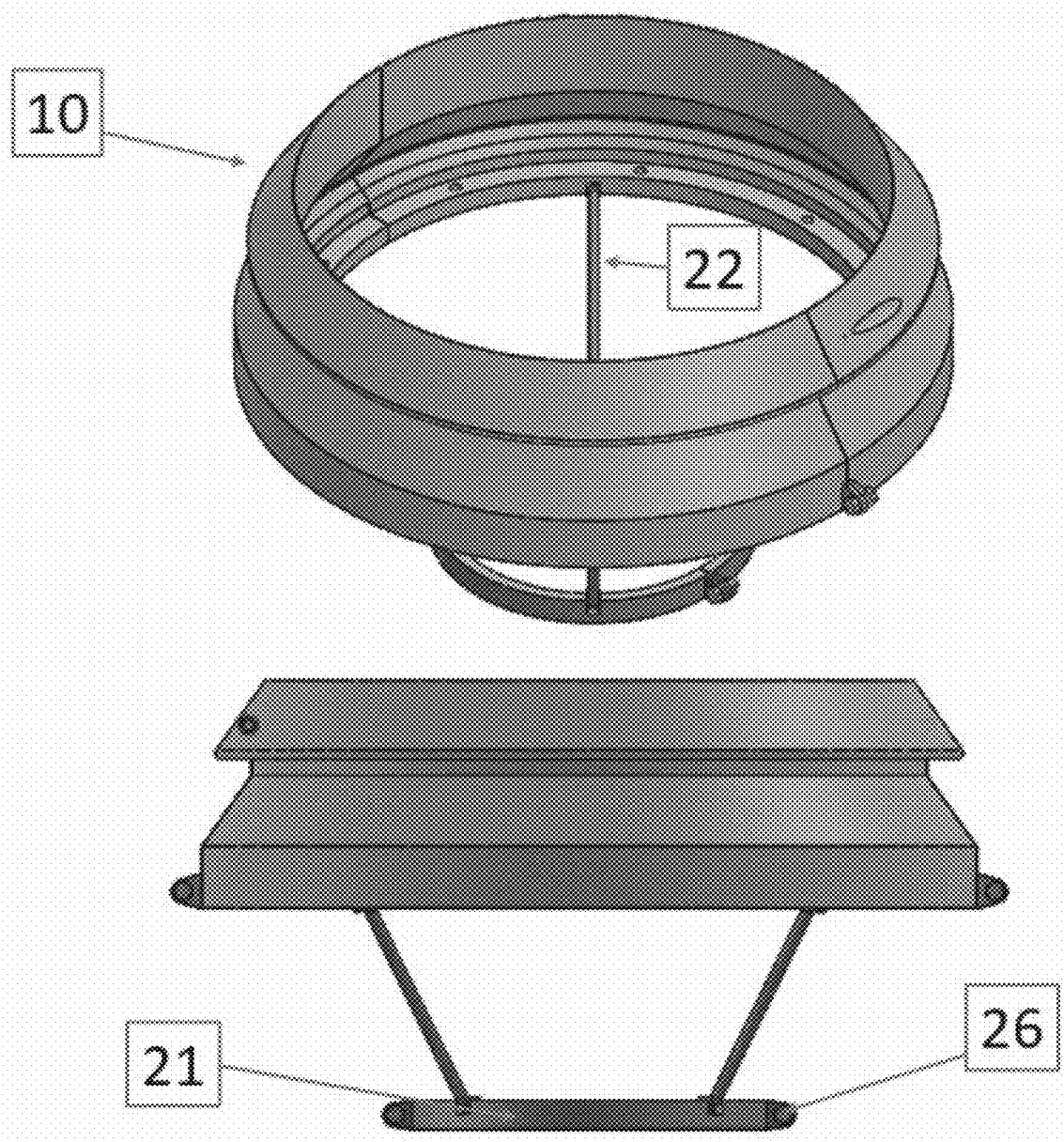
FIG. 7 illustrating the adapter split ring and ring/rod support system assembly.

FIG. 7 presents a view of the adapter split ring (10) supported by the four support rods (22), without the stiffener assembly (100) and the helmet (40).

Figure 6:
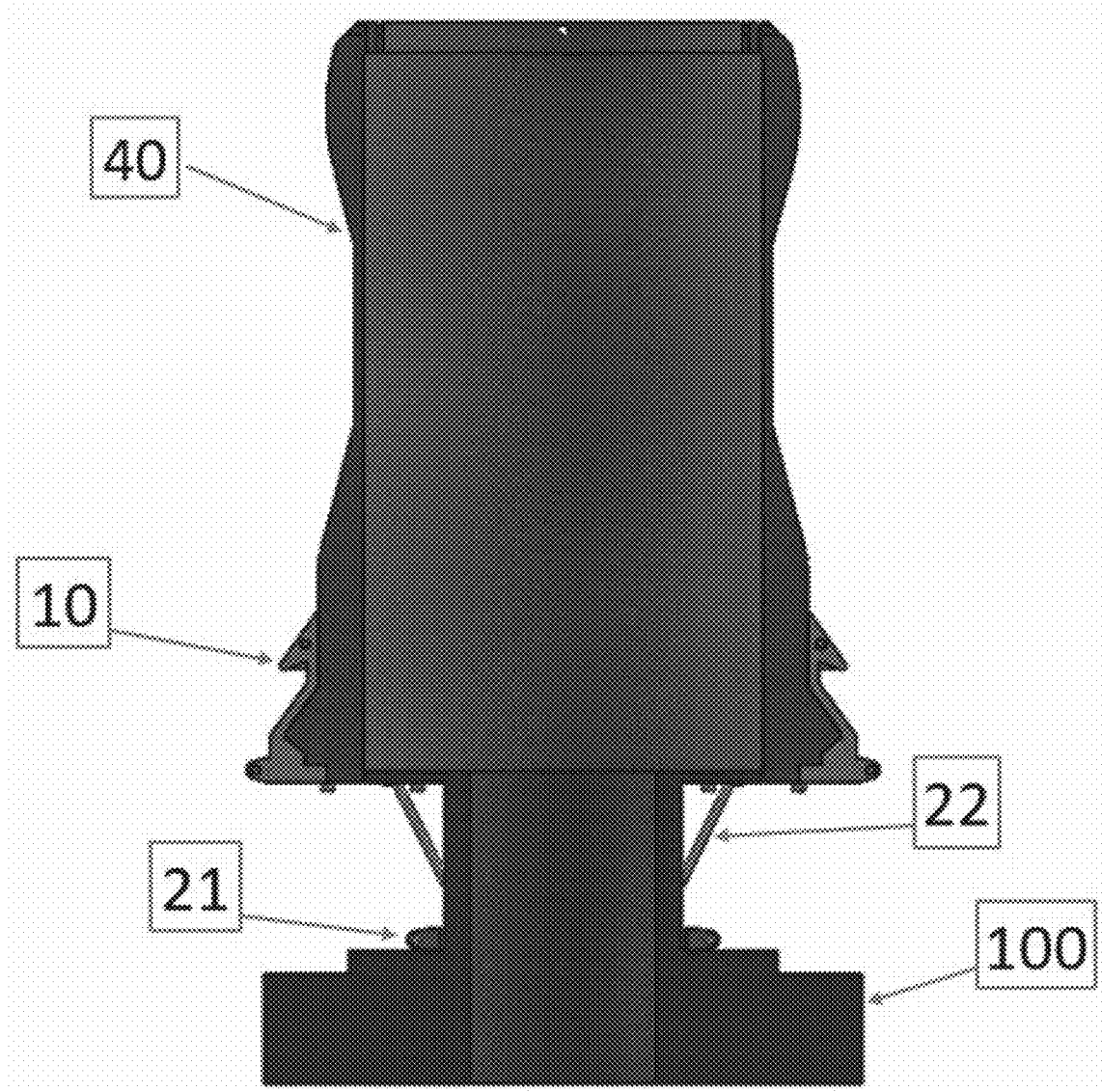
FIG. 6 illustrating the assembly of the first half of the adapter split ring in the stiffener plus helmet assembly.

Next, the other half of the adapter split ring (10) is positioned below the helmet (40), together with the support ring (21) and the rods (22) (FIG. 6). The adapter split ring (10) is then locked using fasteners (15), as shown in FIG. 3. FIG. 8 shows a section view of the application of the adapter split ring (10) in the DLBM type support system with ring/rod fastening system (20).

The two proposed adapter solutions require a sequential assembly process necessary for correct use of adapters and operational safety. Accordingly, an assembly method exclusively carried out by means of screws (13) scattered in the split ring (10), requires the following steps:
  a. assembling the guide pins (11c) in one of the halves of the adapter split ring (10);
  b. positioning the first half of the adapter split ring (10) below the helmet (40);
  c. fastening the split ring with fasteners through the through holes;
  d. positioning the second half of the adapter split ring (10) below the helmet (40), fitting the first half through the guide pins;
  e. fastening the second half of the split ring with fasteners through the through holes;
  f. locking the adapter split ring (10) using fasteners (15);

In the case of needing the support assembly consisting of ring/rods (20), the correct sequential order of assembly must be:
  a. assembling the guide pins (11c) in one of the halves of the adapter split ring (10);
  b. assembling the rods (22) in the two halves of the support ring (21);
  c. positioning the adapter split ring (10) below the helmet (40) together with the support ring (21) and the rods (22);
  d. positioning the second half of the adapter split ring (10) below the helmet (40), fitting the first half through the guide pins, together with the support ring (21) and the rods (22);
  e. locking the adapter split ring (10) using fasteners (15);
  f. locking the support ring (21) using fasteners (23).

The invention claimed is:
1. An adapter tool for coupling a bend stiffener with a diverless bell mouth interface (DLBM) into a bell mouth, comprising:
  a split ring adapter comprising two halves, wherein each half comprises:

a flange comprising a first end and a second end, wherein the first end of the flange comprises a throughhole formed therein and extending circumferentially along a portion of the flange, and wherein the second end of the flange comprises a threaded hole formed therein extending circumferentially along a portion of the flange;

wherein the threaded hole of a first half aligns with the throughhole of a second half; and a support comprising:
  a split support ring; and
  a plurality of support rods connected to and extending from the split support ring, and wherein the plurality of support rods contact a bottom of the split ring adapter.

2. The tool according to claim 1, wherein each half of the split ring adapter are joined together by fasteners via the through holes and the threaded holes.

3. The tool of claim 1, wherein each half of the split ring adapter further comprises one or more eyes, configured to receive fasteners for joining the split ring adapter halves.

4. The tool of claim 1, wherein each half of the split ring adapter further comprises a lower part disposed opposite the flange, the lower part comprising a plurality of connection holes, wherein the connection holes are configured to receive fasteners to couple the DLBM to the split ring adapter.

5. A method of assembling a split ring adapter, the method comprising:
  positioning a first half of a split ring adapter below a diverless bell mouth interface (DLBM), the first half of the split ring adapter comprising a flange with a throughhole formed therein and extending circumferentially along a portion of the flange;
  fastening the first half of the split ring adapter to the DLBM by a plurality of fasteners inserted into a plurality of connection holes positioned on a lower part of the first half of the split ring adapter;
  positioning a second half of the split ring adapter below the DLBM, the second half of the split ring adapter comprising a flange with a threaded hole extending circumferentially along a portion of the flange;
  fitting a fastener through the throughhole of the first half of the split ring adapter and the threaded hole of the second half of the split ring adapter;
  fastening the second half of the split ring to the DLBM by securing a plurality of fasteners through a plurality of connection holes positioned on a lower part of the second half of the split ring adapter; and
  locking the two halves of the split ring adapter with fasteners through one or more eyes formed on a lower portion of each half of the split ring adapter.

6. The method of claim 5, further comprising:
  positioning a support in contact with a bottom surface of the split ring adapter, the support comprising a support ring and a plurality of support rods connected to and extending from the support ring, wherein the plurality of support rods contact the bottom surface of the split ring adapter.

7. The method of claim 6, wherein the support ring comprises two halves, and wherein the method further comprises locking the two halves of the support together using one or more fasteners.

8. The method claim 5, wherein each half of the split ring adapter comprises a first end and a second end, and wherein the throughhole is disposed on the first end and the threaded hole is disposed on the second end.

9. The method of claim 8, wherein fitting a fastener through the throughhole of the first half of the split ring adapter and into the threaded hole of the second half of the split ring adapter comprises aligning the first end of a first half of the split ring adapter with a second end of a second half of the split ring adapter.

\* \* \* \* \*